US012638870B2

(12) United States Patent
Lien et al.

(10) Patent No.: US 12,638,870 B2
(45) Date of Patent: May 26, 2026

(54) VOLTAGE REFERENCE CIRCUIT BASED ON FIELD EFFECT TRANSITORS

(71) Applicant: TAIWAN SEMICONDUCTOR MANUFACTURING COMPANY, LTD., Hsinchu (TW)

(72) Inventors: Bei-Shing Lien, Hsinchu (TW); Szu-Lin Liu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 199 days.

(21) Appl. No.: 18/403,931

(22) Filed: Jan. 4, 2024

(65) Prior Publication Data

US 2025/0103073 A1 Mar. 27, 2025

Related U.S. Application Data

(60) Provisional application No. 63/591,702, filed on Oct. 19, 2023, provisional application No. 63/584,616, (Continued)

(51) Int. Cl.
*G05F 1/46* (2006.01)
*G05F 1/567* (2006.01)
(Continued)

(52) U.S. Cl.
CPC .............. *G05F 1/468* (2013.01); *G05F 1/567* (2013.01); *G05F 1/575* (2013.01); *G05F 3/262* (2013.01)

(58) Field of Classification Search
CPC .......... G05F 1/468; G05F 1/567; G05F 1/575; G05F 3/262
See application file for complete search history.

(56) References Cited

U.S. PATENT DOCUMENTS 5,432,432 A * 7/1995 Kimura .................. G05F 3/245 323/313
7,652,520 B2 * 1/2010 Gatta .................... H10D 84/83 327/581
(Continued)

FOREIGN PATENT DOCUMENTS

TW 521488 2/2003
TW I774386 8/2022

*Primary Examiner* — Rafael O De Leon Domenech
(74) *Attorney, Agent, or Firm* — Hauptman Ham, LLP

(57) ABSTRACT

An integrated circuit includes a first temperature-sensitive device having a first stacked gate device formed and a second stacked gate device, and a second temperature-sensitive device having a third stacked gate device. The first temperature-sensitive device is configured to generate a first voltage which monotonically increases with an absolute temperature. The second temperature-sensitive device is configured to generate a second voltage which monotonically decreases with the absolute temperature. The integrated circuit also includes an output terminal configured to generate a reference voltage which is based on the first voltage from the first temperature-sensitive device and the second voltage from the second temperature-sensitive device. Each of the first stacked gate device, the second stacked gate device, and the third stacked gate device is formed with a first group of field-effect transistors stacked together.

20 Claims, 9 Drawing Sheets

Related U.S. Application Data filed on Sep. 22, 2023, provisional application No. 63/502,729, filed on May 17, 2023, provisional application No. 63/495,192, filed on Apr. 10, 2023.

(51) Int. Cl.

| | |
|---|---|
| ***G05F 1/575*** | (2006.01) |
| ***G05F 3/26*** | (2006.01) |

(56) References Cited

U.S. PATENT DOCUMENTS

| | | | |
|---|---|---|---|
| 2017/0077837 | A1 | 3/2017 | Gu et al. |
| 2022/0286117 | A1 | 9/2022 | Tsai et al. |

* cited by examiner

VOLTAGE REFERENCE CIRCUIT BASED ON FIELD EFFECT TRANSITORS

CROSS-REFERENCE TO RELATED APPLICATIONS

This application claims the benefit of U.S. Provisional Application No. 63/591,702, filed Oct. 19, 2023, U.S. Provisional Application No. 63/584,616, filed Sep. 22, 2023, U.S. Provisional Application No. 63/502,759, filed May 17, 2023, and U.S. Provisional Application No. 63/495,192, filed Apr. 10, 2023, each of which is hereby incorporated by reference in its entirety.

BACKGROUND

The recent trend in miniaturizing integrated circuits (ICs) has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout designs for integrated circuits while ensuring that the standard cell layout design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
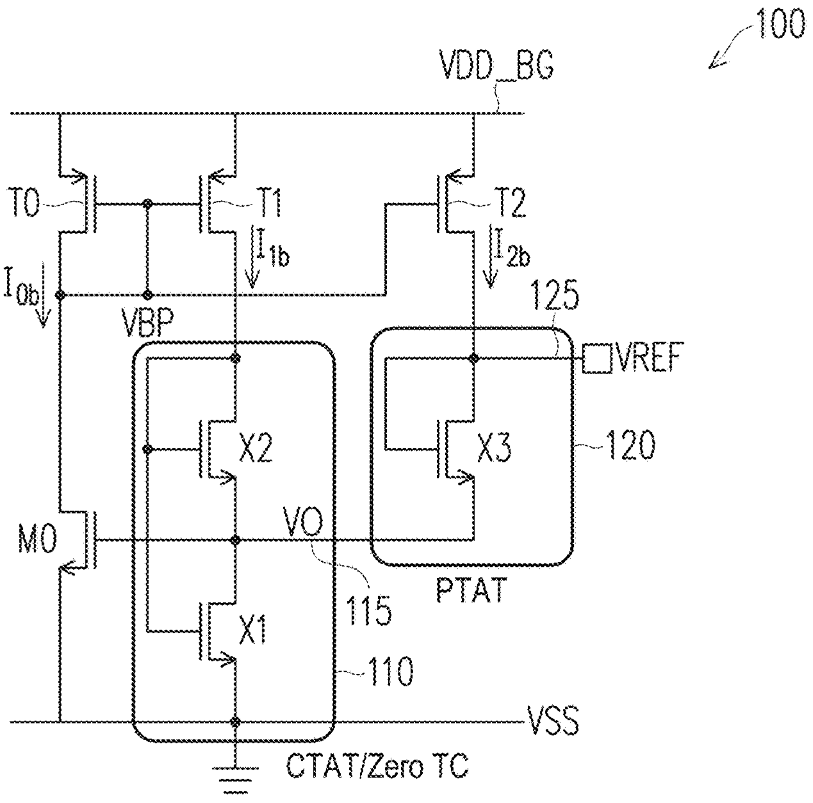
FIG. 1A is a circuit diagram of a voltage reference circuit implemented to generate a reference voltage based on stacked gate devices, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a voltage reference circuit is implemented to generate a reference voltage based on stacked gate devices. A stacked gate device includes a group of FETs having gate terminals connected together in parallel and having channels connected together in series. A first temperature-sensitive device is implemented based on stacked gate devices to generate a first voltage which monotonically increases with an absolute temperature. A second temperature-sensitive device is implemented based on stacked gate devices to generate a second voltage which monotonically decreases with the absolute temperature. The reference voltage is generated based on the summation of the first voltage from the first temperature-sensitive device and the second voltage from the second temperature-sensitive device. The temperature coefficients of the first temperature-sensitive device and the second temperature-sensitive device are adjusted to reduce the temperature-dependency of the reference voltage generated.

Figure 1B:
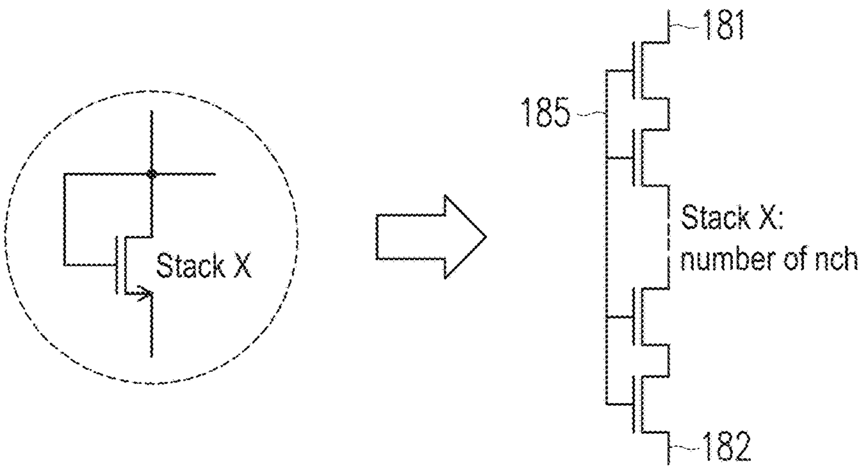
FIG. 1B is a circuit diagram of a stacked gate device, in accordance with some embodiments.

FIG. 1A is a circuit diagram of a voltage reference circuit 100 implemented to generate a reference voltage based on stacked gate devices, in accordance with some embodiments. FIG. 1B is a circuit diagram of a stacked gate device, in accordance with some embodiments. In FIG. 1A, the voltage reference circuit 100 includes field-effect transistors ("FETs") T0, T1, T2, and M0. Each of the FETs has a gate terminal and a channel between a source terminal and a drain terminal. The channel current passing through the channel depends upon the voltage applied to the gate terminal. A transconductance of an FET is a ratio between a small change of the channel current and a small change of the gate-to-source voltage, where the small change of the channel current is induced by the small change of the gate-to-source voltage as the drain-to-source voltage of the FET is maintained constant.

The voltage reference circuit 100 also includes stacked gate devices X1, X2, and X3. Each of the stacked gate devices X1, X2, and X3 includes a group of FETs stacked together. Each of the references X1, X2, and X3 is also used to identify an integer number that represents correspondingly the number of FETs in the stacked gate devices X1, X2, or X3. For example, as shown in FIG. 1B, a stacked gate device X includes a group of FETs stacked together. The total number of the FETs in the group is specified as an integer X. The gate terminals of the FETs in the group are connected together as a stacked gate 185 of the stacked gate device X. The channels of the FETs in the group are serially connected between a first terminal 181 of the stacked gate device X and a second terminal 182 of the stacked gate device X. As the channels of the FETs in the group are serially connected, a source terminal of the first FET is connected to a drain terminal of the second FET, a source terminal of the second FET is connected to a drain terminal of the third FET is connected, . . . , and a source terminal of the (X−1)'th FET is connected to a drain terminal of the last FET. That is, for each integer n in the range from 1 to X−1, a source terminal of the n'th FET is connected to a drain terminal of the (n+1)'th FET. The drain terminal of the first FET becomes the drain of the stacked gate device, and the source terminal of the last FET becomes the source of the stacked gate device.

In FIG. 1A, the channels of the FET TO and FET M0 are connected in series between a power supply VDD_BG and a common voltage VSS. The gate terminals of the FETs TO, T1, and T2 are connected together. Additionally, the channel of the FET T1 is connected between the power supply VDD_BG and the drain terminal of the stacked gate device X2. The channel of the stacked gate device X1 is connected between the source terminal of the stacked gate device X2 and the common voltage VSS. The stacked gates of the stacked gate device X1 and the stacked gate device X2 are all connected to the drain terminal of the stacked gate device X2. Furthermore, the channel of the FET T2 is connected between the power supply VDD_BG and the drain terminal of the stacked gate device X3. The stacked gate of the stacked gate device X3 is connected to the drain terminal of the stacked gate device X3. The source of the stacked gate device X3 and the source of the stacked gate device X2 are both connected to the gate terminal of the FET M0.

The stacked gate device X2 and the stacked gate device X1 form a temperature-sensitive device 110. The voltage at the node 115 connecting the source terminal of the stacked gate device X2 and the drain terminal of the stacked gate device X1 is the voltage generated by the temperature-sensitive device 110. The generated voltage monotonically increases with an absolute temperature. In some embodiments, the temperature-sensitive device 110 is a PTAT device configured to generate a voltage which is proportional to the absolute temperature (PTAT).

The stacked gate device X3 forms a temperature-sensitive device 120. The voltage generated by the temperature-sensitive device 120 monotonically decreases with the absolute temperature. In some embodiments, the temperature-sensitive device 120 is a CTAT device configured to generate a voltage which is complementary to the absolute temperature (CTAT). In FIG. 1A, the voltage generated by the temperature-sensitive device 120 is the voltage difference between the drain terminal of the stacked gate device X3 and the source terminal of the stacked gate device X3.

The FET TO and FET T1 are configured to function as a first current mirror device such that the current I1*b* passing through the channel of the FET T1 is proportional to the current I0*b* passing through the channel of the FET TO. When the FET TO and FET T1 are designed with identical electrical characteristics (such as, same gate width, same threshold, and same transconductance), the current I1*b* in the channel of the FET T1 is equal to the current I0*b* in the channel of the FET TO. The FET T1 functions as a current source, and the current I1*b* flowing through the channel of the FET T1 is injected into the drain terminal of the stacked gate device X2.

The FET TO and FET T2 are configured to function as a second current mirror device such that the current I2*b* passing through the channel of the FET T2 is proportional to the current I0*b* passing through the channel of the FET TO. When the FET TO and FET T2 are designed with identical electrical characteristics (such as, same gate width, same threshold, and same transconductance), the current I2*b* in the channel of the FET T2 is equal to the current I0*b* in the channel of the FET TO. The FET T2 functions as a current source, and the current I2*b* flowing through the channel of the FET T2 is injected into the drain terminal of the stacked gate device X3.

While each of the current I1*b* in the channel of the FET T1 and the current I2*b* in the channel of the FET T2 is determined by the current I0*b* in the channel of the FET TO, the current I0*b* is determined by the gate-to-source voltage applied to the gate terminal of the FET M0. In FIG. 1A, the gate terminal of the FET M0 is connected to the node 115. As the voltage at the node 115 is applied to the gate terminal of the FET M0, a negative feedback loop is completed. Responsive to an increase of the current I0*b* in the channel of the FET TO, each of the current I1*b* in the channel of the FET T1 and the current I2*b* in the channel of the FET T2 increases as well, which induces a voltage reduction at the node 115 and at the gate terminal of the FET M0. The voltage reduction at the gate terminal of the FET M0 further induces a current reduction of the current I0*b* in the channel of the FET TO. Consequently, fluctuations of the current I0*b*, the current I1*b*, the current I2*b*, and the voltage at the node 115 are all reduced because of the negative feedback.

Figure 2A:
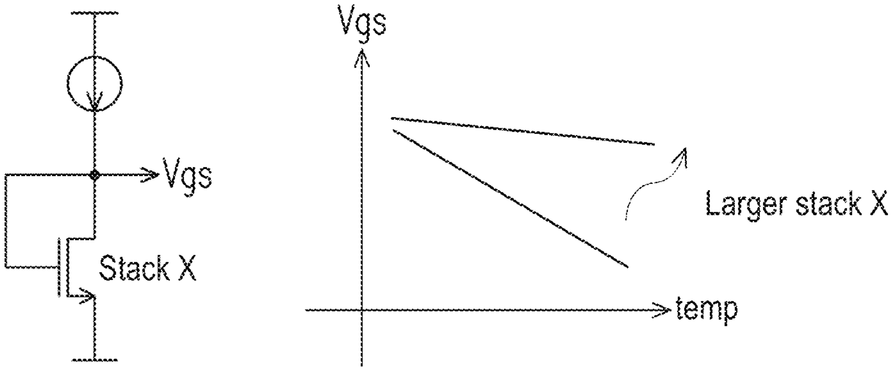
FIG. 2A is a voltage-temperature curve of a stacked gate device, in accordance with some embodiments.

In FIG. 1A, the temperature-sensitive devices 110 and 120 are implemented with stacked gate devices X1, X2, and X3. In response to the stacked gate of a stacked gate device X being connected to the drain terminal of the stacked gate device X, as shown in FIG. 2A, the voltage Vgs between the drain terminal and the source terminal of the stacked gate device X decreases if the temperature of the stacked gate device X increases. The stacked gate devices X includes a group of FETs stacked together. The downward slope of the voltage-temperature curve ("V-T curve") in FIG. 2A, as the absolute value of temperature coefficient dV/dT, depends upon the number of the FETs in the group. As the number of the FETs in the group increases, the slope of the V-T curve in FIG. 2A decreases, and the voltage Vgs between the drain terminal and the source terminal of the stacked gate device X becomes less sensitive to temperature changes.

In FIG. 1A, the temperature-sensitive device 120 is a CTAT device which is implemented as a stacked gate device X3 having a group of FETs stacked together. In some embodiments, the downward slope of the V-T curve of the stacked gate device X3 is adjusted by changing the number X3 of the FETs in the group.

Figure 2B:
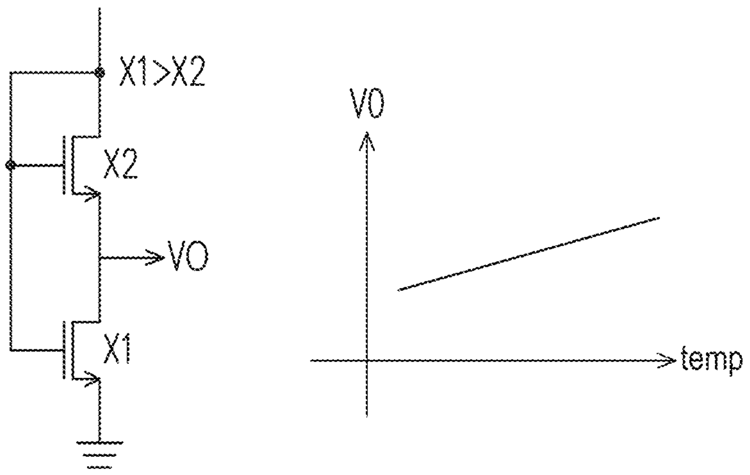
FIG. 2B is a voltage-temperature curve of a temperature-sensitive device implemented with two stacked gate devices connected in series, in accordance with some embodiments.

In FIG. 1A, the temperature-sensitive device 110 is a PTAT device which is implemented with the stacked gate device X2 and the stacked gate device X1. Each of the drain-to-source voltage of the stacked gate device X2 and the drain-to-source voltage of the stacked gate device X1 decreases in response to a rising temperature. The downward slope of the V-T curve of the stacked gate device X2 becomes less steep as the number X2 of the FETs in the stacked gate device X2 increases. The downward slope of the V-T curve of the stacked gate device X1 becomes less steep as the number X1 of the FETs in the stacked gate device X1 increases. In some implementations, the voltage VO generated by the temperature-sensitive device 110 at the node 115 increases in response to a rising temperature, in response to the number X2 of the FETs in the stacked gate device X2 being smaller than the number X1 of the FETs in the stacked gate device X1. The proper selection of the number X2 and the number X1 enables the temperature-sensitive device 110 to function as a PTAT device, and as shown in FIG. 2B, voltage VO at the node 115 versus temperature is plotted as a V-T curve that has an upward slope. The upward slope depends upon the difference X1-X2 between the number X1 and the number X2. The larger the difference X1-X2 between the number X1 and the number X2, the larger the upward slope. In some embodiments, the number X1 and the number X2 are adjusted to create a PTAT device (e.g., a temperature-sensitive device 110 in FIG. 1A) that has an upward slope that can be canceled out with the downward slope of another CTAT device (e.g., a temperature-sensitive device 120 in FIG. 1A).

In FIG. 1A, the drain-to-source voltage of the stacked gate device X3 is added to the voltage VO at the node 115 between the stacked gate device X2 and the stacked gate device X1. Because the voltage VO increases but the drain-to-source voltage of the stacked gate device X3 decreases as a function of the temperature rises, the output voltage VREF becomes less sensitive to temperature changes. The number X2 of the FETs in the stacked gate device X2, the number X1 of the FETs in the stacked gate device X1, and the number X3 of the FETs in the stacked gate device X3 are adjusted to minimize the temperature dependency of the output voltage VREF at the output terminal 125 of the voltage reference circuit 100. In some embodiments, the rising rate of the voltage-temperature curve of the temperature-sensitive device 110 is adjusted by selecting the difference X1−X2 between the number X1 and the number X2. The falling rate of the voltage-temperature curve of the temperature-sensitive device 120 is adjusted by selecting the number X3.

The temperature dependency of the output voltage VREF at the output terminal 125 depends upon the matching between the voltage-temperature rising rate of the temperature-sensitive device 110 and the voltage-temperature failing rate of the temperature-sensitive device 120. The better the matching between the voltage-temperature rising rate and the voltage-temperature failing rate, the smaller the temperature dependency of the output voltage VREF. That is, the better the matching, the smaller the changes of the output voltage VREF induced by the temperature changes. In addition to changing the integer values of the numbers X1, X2, and X3, in some embodiments, the matching between the voltage-temperature rising rate and the voltage-temperature failing rate is further fine-tuned with dynamic element matching ("DEM") techniques. In some embodiments, DEM techniques are applied to the voltage reference circuit 100 of FIG. 1A in which the temperature-sensitive device 120 has multiple stacked gate devices connected in parallel.

Figure 3A:
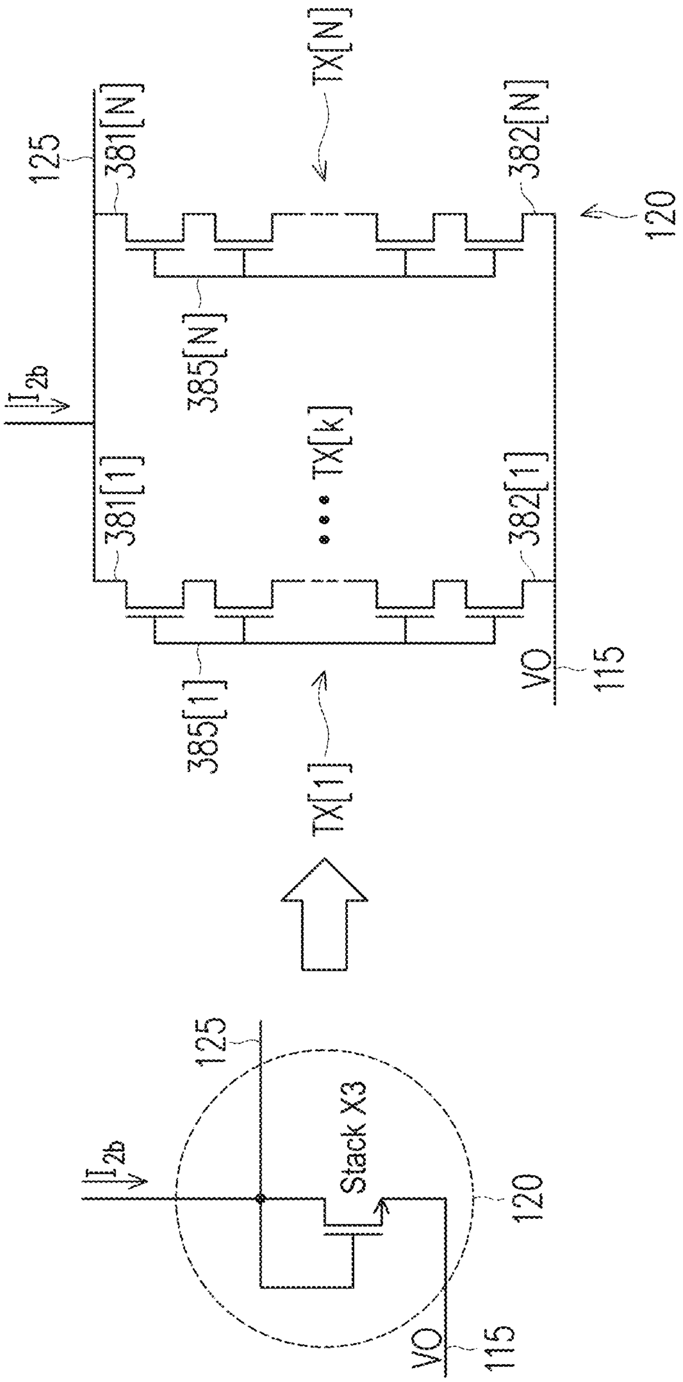
FIG. 3A is a circuit diagram of a temperature-sensitive device implemented with stacked gate devices which are parallelly connected, in accordance with some embodiments.

FIG. 3A is a circuit diagram of a temperature-sensitive device implemented with stacked gate devices which are parallelly connected, in accordance with some embodiments. The temperature-sensitive device in FIG. 3A is different from the temperature-sensitive device in FIG. 1B. Specifically, the temperature-sensitive device in FIG. 1B has a stacked gate device X implemented with a group of FETs stacked together. The temperature-sensitive device in FIG. 3A, however, has at least two stacked gate devices.

In the example implementation as shown FIG. 3A, the temperature-sensitive device 120 is implemented with stacked gate devices TX[1], . . . , TX[k], . . . , and TX[N]. Here, the number N and the index k are positives integers (with k≤N). Each of the N stacked gate devices is formed with a group of FETs stacked together, and the N stacked gate devices are connected in parallel. For example, as explicitly depicted in FIG. 3A, each of the stacked gate devices TX[1] and TX[N] includes a group of FETs that are stacked together. The channels of all FETs in the stacked gate device TX[1] are serially connected between a first terminal 381 [1] and a second terminal 382 [1], and the gate terminals of all FETs in the stacked gate device TX[1] are connected together as a stacked gate 385 [1]. The channels of all FETs in the stacked gate device TX[N] are serially connected between a first terminal 381 [N] and a second terminal 382 [N], and the gate terminals of all FETs in the stacked gate device TX[N] are connected together as a stacked gate 385 [N]. Similarly, each stacked gate device TX[k] also includes a group of FETs that are stacked together (which are not explicitly depicted in the figure). The channels of all FETs in the stacked gate device TX[k] are serially connected between a first terminal 381 [k] and a second terminal 382 [k], and the gate terminals of all FETs in the stacked gate device TX[k] are connected together as a stacked gate 385 [k]. In FIG. 3A, the stacked gate of each stacked gate device is connected to the output terminal 125.

Figure 3B:
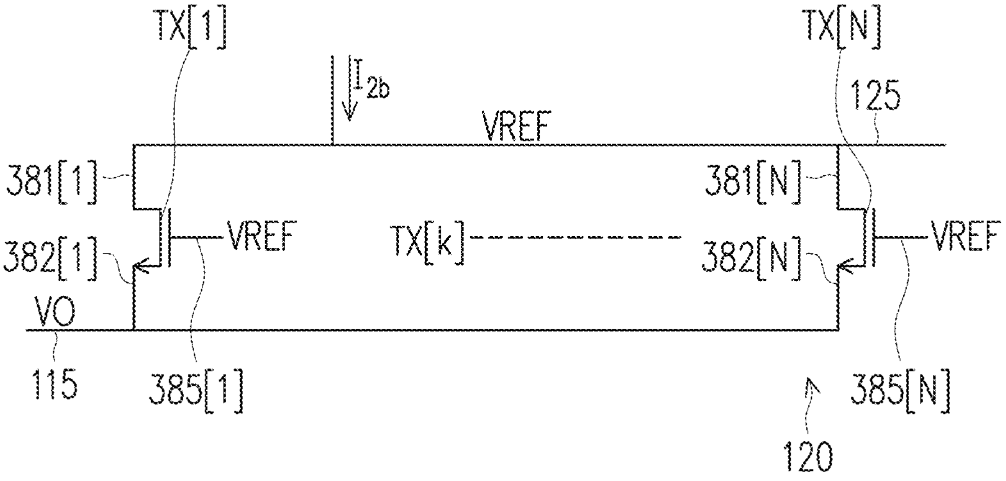
FIG. 3B is a circuit diagram of an equivalent circuit of the temperature-sensitive device in FIG. 3A.

FIG. 3B is a circuit diagram of an equivalent circuit of the temperature-sensitive device 120 in FIG. 3A. The first terminals (such as, 381 [1] and 381 [N]) of the stacked gate devices TX[1], . . . , TX[k], . . . , and TX[N] are connected to the output terminal 125 of the voltage reference circuit (and also connected to the current source that generates the current I2*b*). The second terminals (such as, 382 [1] and 382 [N]) of the stacked gate devices TX[1], . . . , TX[k], . . . , and TX[N] are connected to the node 115 (which is connected to the first terminal of the stacked gate device X1, in the implementation of FIG. 1A).

In FIG. 3B, the stacked gate of each stacked gate device (i.e., TX[1], . . . , TX[k], . . . , or TX[N]) is maintained at the output voltage VREF of the output terminal 125, and consequently, a total of N stacked gate devices are connected in parallel between the output terminal 125 and the node 115. The voltage-temperature curve of the temperature-sensitive device 120 depends upon the properties of the N stacked gate devices TX[1], . . . , TX[k], . . . , and TX[N]. In some modified implementations of the temperature-sensitive device 120 in FIG. 3A, the voltage-temperature curve of the temperature-sensitive device 120 does not depend upon the property of at least one of the N stacked gate devices. That is, in the modified implementations, the voltage-temperature curve of the temperature-sensitive device 120 depends upon the properties of some of the N stacked gate devices TX[1], . . . , TX[k], . . . , and TX[N]. For example, in some modified implementations, the stacked gate of an unselected stacked gate device TX[$k_0$] (with integer k0≤N) is maintained at the lower supply voltage VSS (which is lower than the voltage VO at the node 115), and consequently, the conductivity of the channel between the first terminal and the second terminal of the unselected stacked gate device TX[$k_0$] is equivalent to that of an open circuit. That is, in an implementation of the temperature-sensitive device 120 in which the stacked gate of the unselected stacked gate device TX[$k_0$] is maintained at the lower supply voltage VSS, the voltage-temperature curve of the temperature-sensitive device 120 does not depend upon the property of the unselected stacked gate device TX[$k_0$], while the voltage-temperature curve of the temperature-sensitive device 120 depends upon the properties of the remaining N−1 stacked gate devices. In some embodiments, at least two unselected stacked gate devices are generated, and the properties of the at least two unselected stacked gate devices have no influence on the voltage-temperature curve of the temperature-sensitive device 120.

In some embodiments, the voltage VREF is applied to the gate terminals of the selected stacked gate devices and the voltage VSS is applied to the gate terminals of the unselected stacked gate devices. Consequently, the voltage-temperature curve of the temperature-sensitive device 120 depends upon the properties of the selected stacked gate devices but does not depend upon the properties of the unselected stacked gate devices. The method of creating a set of selected stacked gate devices which contributes to the voltage-temperature curve of the temperature-sensitive device 120 forms the basis of applying DEM techniques to the voltage reference circuit 100 of FIG. 1A.

Figure 4:
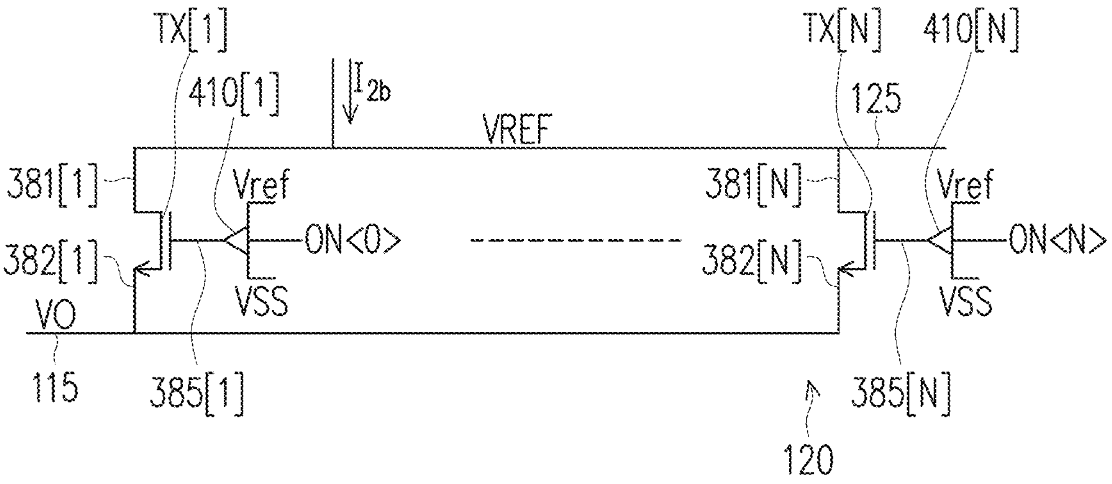
FIG. 4 is a circuit diagram of a temperature-sensitive device implemented to adjust the voltage-temperature curve with dynamic element matching ("DEM") techniques, in accordance with some embodiments.

FIG. 4 is a circuit diagram of a temperature-sensitive device 120 implemented to adjust the voltage-temperature curve with DEM techniques, in accordance with some embodiments. The temperature-sensitive device 120 includes a fixed number of stacked gate devices TX[1], TX[2], . . . , and TX[N]. Here, the number N is an integer. The drain terminals of the stacked gate devices TX[1], TX[2], . . . , and TX[N] are connected to the output voltage VREF at the output terminal 125 of a voltage reference circuit (such as, voltage reference circuit 100 in FIG. 1A). The source terminals of the stacked gate devices TX[1], TX[2], . . . , and TX[N] are connected to the voltage VO at the node 115 (e.g., the node as shown in FIG. 1A). The gate terminal of each of the stacked gate devices TX[1], TX[2], . . . , and TX[N] is connected to the output of a corresponding gate driver. Each gate driver has an output voltage swing in a range from VSS to VREF. The input of a gate driver 410 [k] (which is not explicitly shown in the figure) is configured to receive a logic signal for controlling the stacked gate device TX[k], where the integer k is in the range from 1 to N. For example, the input of a gate driver 410 [1] is configured to receive a logic signal for controlling the stacked gate device TX[1], and the input of a gate driver 410 [N] is configured to receive a logic signal for controlling the stacked gate device TX[N].

In operation, during each given time period, a set of stacked gate devices is selected with the logic signals applied to the inputs of the gate drivers; as a result, the voltage VREF is applied to the gate terminals of the selected stacked gate devices and the voltage VSS is applied to the gate terminals of the unselected stacked gate devices. The number of selected stacked gate devices is an integer M<N, and the number of unselected stacked gate devices is an integer N-M. Different voltage-temperature failing rates of the temperature-sensitive device 120 are obtained with different set of selected stacked gate devices, which enables fine adjustments of the voltage-temperature failing rate of the temperature-sensitive device 120. In some embodiments, different sets of stacked gate devices are selected for consecutive two time periods, and the voltage-temperature failing rates of the temperature-sensitive device 120 due to different sets of stacked gate devices are averaged over time, which enables additional fine adjustments of the voltage-temperature failing rate of the temperature-sensitive device 120.

In some embodiments, for all possible choices of selecting M stacked gate devices from a total of N stacked gate devices, each choice corresponds to a set of stacked gate devices which are selectable with logic signals applied to the gate drivers. After a total of N!/M! (N−M)! different time periods, all possible selections of the set of stacked gate devices are carried out, the voltage-temperature failing rate of the temperature-sensitive device 120 is adjusted by adjusting the integer number M, and the temperature-sensitive device 120 also has reduced failing rate variation caused by the device fabrication variations. In addition to the examples provided above, other methods of forming possible choices of different sets of selected stacked gate devices for time average are within the contemplated scope of present disclosure.

Figure 5A:
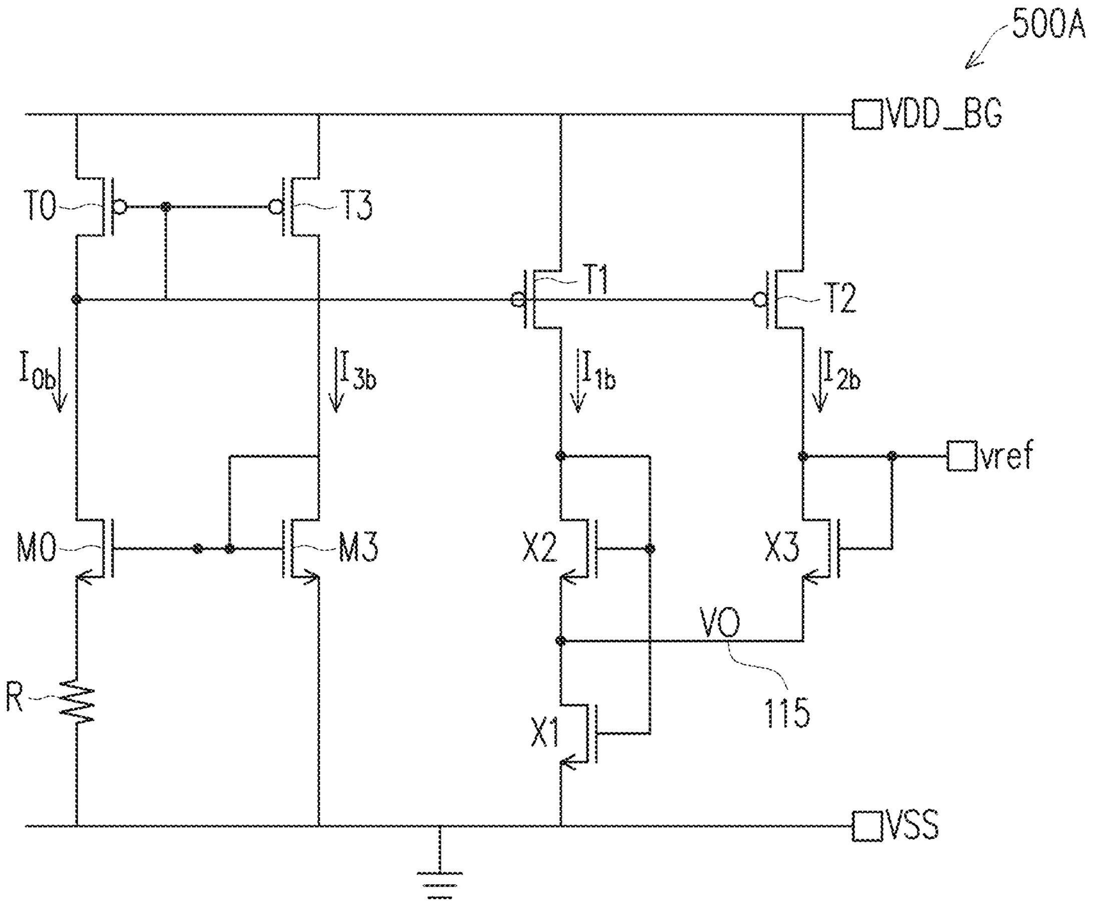
FIGS. 5A-5B are circuit diagrams of voltage reference circuits implemented with stacked gate devices, in accordance with some embodiments.
Figure 5B:
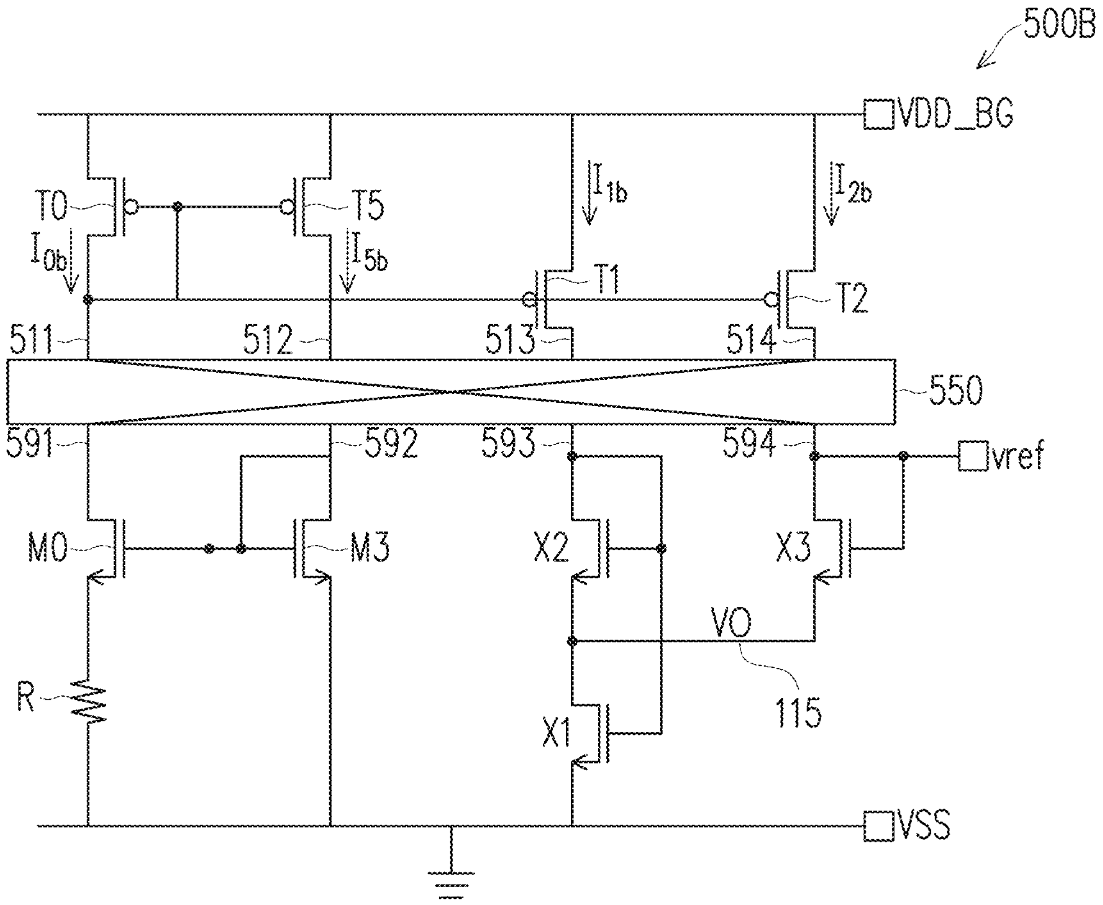

Additional embodiments of integrated circuits to generate a reference voltage based on stacked gate devices are depicted in circuit diagrams of FIGS. 5A-5B. The voltage reference circuit 500A in FIG. 5A is modified from the voltage reference circuit 100 in FIG. 1A. The modification includes adding a FET T3, a FET M3, and a resistor R to the voltage reference circuit 500A in FIG. 5A. The channels of the FET T3 and FET M3 are connected in series between the power supply VDD_BG and the common voltage VSS. The gate terminal of the FET T3 is connected to the gate terminal of the FET TO. The channels of the FET TO and FET M0 and the resistor R are all connected in series between the power supply VDD_BG and the common voltage VSS. The gate terminal of the FET M3 is connected to both the drain terminal of the FET M3 and the gate terminal of the FET M0.

The FET TO and the FET T3 are configured to function as a third current mirror device such that the current I3*b* passing through the channel of the FET T3 is proportional to the current I0*b* passing through the channel of the FET TO. When the FET TO and FET T3 are designed with identical electrical characteristics (such as, same gate width, same threshold, and same transconductance), the current I3*b* in the channel of the FET T2 is equal to the current I0*b* in the channel of the FET TO. The current I3*b* flowing through the channel of the FET T3 is injected into the drain terminal of the FET M3. The voltage at the drain terminal of the FET M3 is applied to the gate terminal of the FET M0, which completes a negative feedback loop. The resistor R connected between the source of terminal of the FET M0 and the common voltage VSS also provides negative feedback with improved stability. Specifically, in response to the current I0*b* in the channel of the FET TO increasing, the voltage drop across the resistor R increases, the voltage at the source of terminal of the FET M0 decreases, which tends to reduce the gate-to-source voltage of the FET M0 and hence tends to reduce the current I0*b*.

The voltage reference circuit 500B in FIG. 5B is modified from the voltage reference circuit 500A in FIG. 5A. The modification includes adding a current path selector 550 to the voltage reference circuit 500B in FIG. 5B. The current path selector 550 in FIG. 5B includes inputs 511, 512, 513, and 514 and outputs 591, 592, 593, and 594. Each of the inputs 511, 512, 513, and 514 is correspondingly connected to one of the source terminals of the FETs TO, T3, T1, and T2. The output 591 is connected to the drain terminal of the FETs M0. The output 592 is connected to the drain terminal of the FETs M3. The output 593 is connected to the drain terminal of the stacked gate devices X2. The output 594 is connected to the drain terminal of the stacked gate devices X3. The current path selector 550 is configured to enable dynamic modifications of the specific conducting paths between the inputs and the outputs in the current path selector 550.

In a default setting of the current path selector 550, the input 511 is paired with the output 591 to form a conducting path from the input 511 to with the output 591, the input 522 is paired with the output 592 to form a conducting path from the input 522 to with the output 592, the input 533 is paired with the output 593 to form a conducting path from the input 533 to with the output 593, and the input 544 is paired with the output 594 to form a conducting path from the input 544 to with the output 594. During the default setting of the current path selector 550, the voltage reference circuit 500B of FIG. 5B has an equivalent circuit that is the same as the voltage reference circuit 500A of FIG. 5A.

In other settings of the current path selector 550, at least one of the conducting paths from an input to an output is altered, as compared with the default setting. In some settings, the input 511 is paired with one of the outputs different from the output 591, the input 522 is paired with one of the outputs different from the output 592, the input 533 is paired with one of the outputs different from the output 593, or the input 544 is paired with one of the outputs different from the output 594.

In some embodiments, the current path selector 550 is at a first setting (such as the default setting) during a first time period and at a second setting during a second time period. For example, in some embodiments, the input 513 is paired with the output 593 and the input 514 is paired with the output 594 during a first time period, but the input 513 is paired with the output 594 and the input 514 is paired with the output 593 during a second time period. In addition, during both the first time period and second time period, the input 511 is paired with the output 591 and the input 512 is paired with the output 592. During the first time period, the current I1*b* in the channel of the FET T1 is injected into the drain terminal of the stacked gate device X2 while the current I2*b* in the channel of the FET T2 is injected into the drain terminal of the stacked gate device X3. During the second time period, however, the current I1*b* in the channel of the FET T1 is injected into the drain terminal of the stacked gate device X3 while the current I2*b* in the channel of the FET T2 is injected into the drain terminal of the stacked gate device X2. Consequently, as the current path selector 550 constantly changes between two settings, the current injected into the drain terminal of the stacked gate device X2 is equal to the time average of the current I1*b* and the current I2*b*, and the current injected into the drain terminal of the stacked gate device X3 is also equal to the time average of the current I1*b* and the current I2*b*. The average currents injected into the stacked gate device X2 and the stacked gate device X3 are the same, which reduces the effect of the current variations in the FETs T1 and T2 due to device fabrication variations.

In some embodiments, the current path selector 550 is set to six different settings during each of six different time periods. For example, in some embodiments, the input 511 is paired with the output 591 during each of the six different time periods. Even though each of the three inputs 512, 513, and 514 is paired with one of the three outputs 592, 593, and 594 during the six different time periods, there is a different pairing between the three inputs 512, 513, and 514 and the three outputs 592, 593, and 594 during each of each of six different time periods. There are a total of six different possible pairings between the three inputs 512, 513, and 514 and the three outputs 592, 593, and 594. During the first time period, the inputs 512, 513, and 514 are paired with the outputs 592, 593, and 594 correspondingly. During the second time period, the inputs 512, 513, and 514 are paired with the outputs 592, 594, and 593 correspondingly. During the third time period, the inputs 512, 513, and 514 are paired with the outputs 593, 592, and 594 correspondingly. During the fourth time period, the inputs 512, 513, and 514 are paired with the outputs 593, 594, and 592 correspondingly. During the fifth time period, the inputs 512, 513, and 514 are paired with the outputs 594, 592, and 593 correspondingly. During the sixth time period, the inputs 512, 513, and 514 are paired with the outputs 594, 593, and 592 correspondingly. Because of the current path selector 550 is set to different settings during each of six different time periods, the time average of the current I1*b*, the current I2*b*, and the current I2*b* is injected into each of the stacked gate devices X2 and X1 and the FET M3. Changing settings of the current path selector 550 reduces the effect of the current variations in the FETs T1, T2, and T3 due to device fabrication variations.

In still some embodiments, each of all possible pairings between the inputs 511, 512, 513, and 514 and the outputs 591, 592, 593, and 594 is selected during one of different time periods, and the effect of the current variations in the FETs TO, T1, T2, and T3 due to device fabrication variations is reduced. In addition to the examples provided above, other methods of selecting pairings between the inputs and the outputs of the current path selector 550 are within the contemplated scope of present disclosure.

Figure 6:
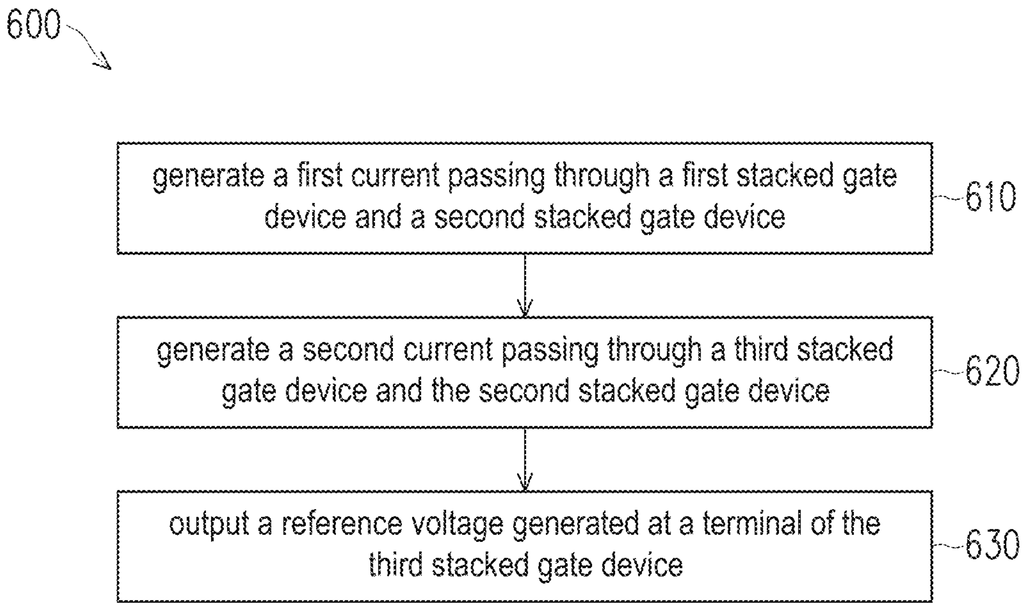
FIG. 6 is a flowchart of a method of generating a reference voltage with reduced temperature-dependency, in accordance with some embodiments.

FIG. 6 is a flowchart of a method 600 of generating a reference voltage with reduced temperature-dependency, in accordance with some embodiments. The sequence in which the operations of method 600 are depicted in FIG. 6 is for illustration only; the operations of method 600 are capable of being executed in sequences that differ from that depicted in FIG. 6. It is understood that additional operations may be performed before, during, and/or after the method 600 depicted in FIG. 6, and that some other processes may only be briefly described herein.

In operation 610 of method 600, a first current is generated to pass through a first stacked gate and a second stacked gate device. In the embodiments as shown in FIG. 1A and FIG. 5A, the current I1*b* in the channel of the FET T1 is generated, and the current I1*b* passes through the stacked gate device X2 and the stacked gate device X1.

In operation 620 of method 600, a second current is generated to pass through a third stacked gate device and the second stacked gate device. In the embodiments as shown in FIG. 1A and FIG. 5A, the current I2*b* in the channel of the FET T2 is generated, and the current I2*b* passes through the stacked gate device X3 and the stacked gate device X1.

In operation 630 of method 600, a reference voltage generated at a terminal of the third stacked gate device becomes the output voltage of a voltage reference circuit. In the embodiments as shown in FIG. 1A and FIG. 5A, the output voltage VREF is generated at the first terminal of the stacked gate device X3. The output voltage VREF is the sum of the drain-to-source voltage of the stacked gate device X3 and the voltage VO at the node 115 (which is generated by the temperature-sensitive device 110).

Figure 7:
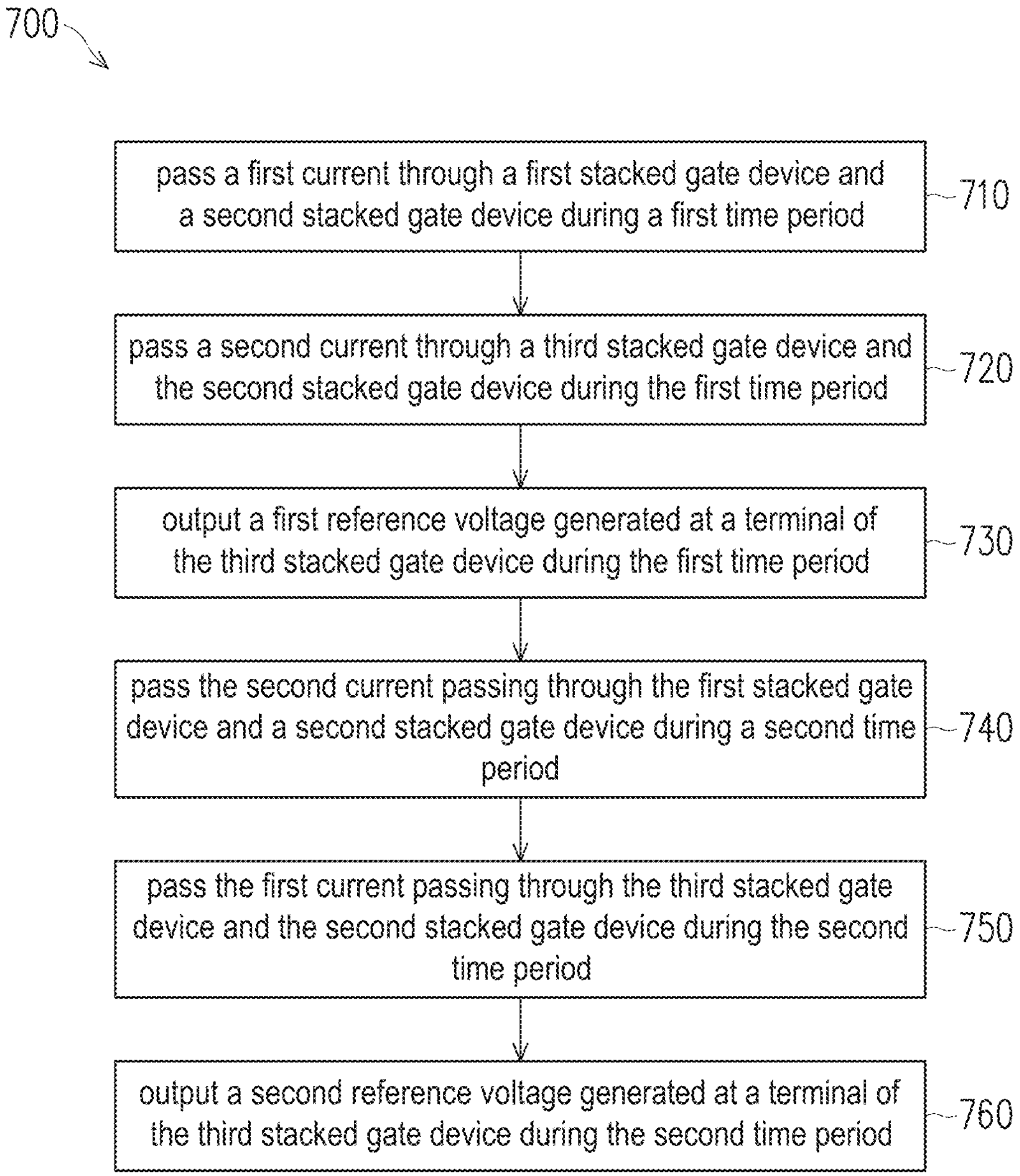
FIG. 7 is a flowchart of a method 700 of generating a time averaged reference voltage with reduced temperature-dependency, in accordance with some embodiments.

FIG. 7 is a flowchart of a method 700 of generating a time averaged reference voltage with reduced temperature-dependency, in accordance with some embodiments. The sequence in which the operations of method 700 are depicted in FIG. 7 is for illustration only; the operations of method 700 are capable of being executed in sequences that differ from that depicted in FIG. 7. It is understood that additional operations may be performed before, during, and/or after the method 700 depicted in FIG. 7, and that some other processes may only be briefly described herein.

In operation 710 of method 700, a first current is caused to pass through a first stacked gate and a second stacked gate device during a first time period. In the embodiments as shown in FIG. 5B, during the first time period, the current I1*b* in the channel of the FET T1 is coupled to the output 593 of the current path selector 550, which causes the current I1*b* to pass through the stacked gate device X2 and the stacked gate device X1.

In operation 720 of method 700, a second current is caused to pass through a third stacked gate device and the second stacked gate device during the first time period. In the embodiments as shown in FIG. 5B, during the first time period, the current I2*b* in the channel of the FET T2 is coupled to the output 594 of the current path selector 550, which causes the current I2*b* to passed through the stacked gate device X3 and the stacked gate device X1.

In operation 730 of method 700, a first reference voltage generated at a terminal of the third stacked gate device becomes the output voltage of a voltage reference circuit during the first time period. In the embodiments as shown in FIG. 5B, during the first time period, the output voltage VREF is generated at the first terminal of the stacked gate device X3 as a first reference voltage.

In operation 740 of method 700, the second current is caused to pass through the first stacked gate and the second stacked gate device during a second time period. In the embodiments as shown in FIG. 5B, during the second time period, the current I2*b* in the channel of the FET T2 is coupled to the output 593 of the current path selector 550, which causes the current I2*b* to passed through the stacked gate device X2 and the stacked gate device X1.

In operation 750 of method 700, the first current is caused to pass through the third stacked gate device and the second stacked gate device during the second time period. In the embodiments as shown in FIG. 5B, during the second time period, the current I1*b* in the channel of the FET T1 is coupled to the output 594 of the current path selector 550, which causes the current I1*b* to pass through the stacked gate device X3 and the stacked gate device X1.

In operation 760 of method 700, a second reference voltage generated at the terminal of the third stacked gate device becomes the output voltage of a voltage reference circuit during the second time period. In the embodiments as shown in FIG. 5B, during the second time period, the output voltage VREF is generated at the first terminal of the stacked gate device X3 as a second reference voltage.

With method 700, the output voltage VREF generated during the first time period is averaged with the output voltage VREF generated during the second time period. The time average of the output voltage VREF reduces the effect of the current variations in the FETs T1 and T2 due to device fabrication variations.

An aspect of the present disclosure relates to an integrated circuit. The integrated circuit includes a first temperature-sensitive device configured to generate a first voltage which monotonically increases with an absolute temperature, a second temperature-sensitive device configured to generate a second voltage which monotonically decreases with the absolute temperature, and an output terminal configured to generate a reference voltage which is based on the first voltage from the first temperature-sensitive device and the second voltage from the second temperature-sensitive device. The first temperature-sensitive device has a first stacked gate device formed with a first group of field-effect transistors (FETs) stacked together and a second stacked gate device formed with a second group of FETs stacked together. The second temperature-sensitive device has a third stacked gate device formed with a third group of FETs stacked together.

Another aspect of the present disclosure relates to an integrated circuit. The integrated circuit includes a first current source, a second current source, and a current path selector having a first input connected to the first current source and having a second input connected to the second current source. The current path selector also has a first output and a second output. The current path selector is configured to connect the first input to the first output and connect the second input to the second output during a first time period and configured to connect the first input to the second output and connect the second input to the first output during a second time period. The integrated circuit also includes a first temperature-sensitive device having a first stacked gate device and a second stacked gate device, and a second temperature-sensitive device having a third stacked gate device. The first stacked gate device has a first terminal thereof connected to the first output of the current path selector and has a stacked gate thereof connected to the first output of the current path selector. The second stacked gate device has a first terminal thereof connected to a second terminal of the first stacked gate device and has a stacked gate thereof connected to the first terminal of the first stacked gate device. The third stacked gate device has a first terminal thereof connected to the second output of the current path selector, has a stacked gate thereof connected to the second output of the current path selector, and has a second terminal thereof connected to the first terminal of the second stacked gate device. Each of the first stacked gate device, the second stacked gate device, and the third stacked gate device is a stacked gate device formed with a group of FETs stacked together.

Still another aspect of the present disclosure relates to a method. The method includes generating a first current passing through a first stacked gate device and a second stacked gate device, generating a second current passing through a third stacked gate device and the second stacked gate device, and outputting a reference voltage generated at a terminal of the third stacked gate device. The first stacked gate device comprises with a first group of FETs stacked together, the second stacked gate device comprises with a second group of FETs stacked together, and the third stacked gate device comprises a third group of FETs stacked together.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An integrated circuit comprising:

a first temperature-sensitive device configured to generate a first voltage which monotonically increases with an absolute temperature, wherein the first temperature-sensitive device has a first stacked gate device formed with a first group of field-effect transistors (FETs) stacked together and a second stacked gate device formed with a second group of FETs stacked together;

a second temperature-sensitive device configured to generate a second voltage which monotonically decreases with the absolute temperature, wherein the second temperature-sensitive device has a third stacked gate device formed with a third group of FETs stacked together;

an output terminal configured to generate a reference voltage which is based on the first voltage from the first temperature-sensitive device and the second voltage from the second temperature-sensitive device;

wherein each FET has a channel thereof between a source terminal thereof and a drain terminal thereof, wherein channels of the FETs in the first group are serially connected between a first terminal of the first stacked gate device and a second terminal of the first stacked gate device, wherein channels of the FETs in the second group are serially connected between a first terminal of the second stacked gate device and a second terminal of the second stacked gate device, and wherein the second terminal of the first stacked gate device is connected to the first terminal of the second stacked gate device; and a current source connected to the first terminal of the first stacked gate device.

2. The integrated circuit of claim 1, wherein the first temperature-sensitive device is a PTAT device configured to generate the first voltage which is proportional to the absolute temperature (PTAT).

3. The integrated circuit of claim 1, wherein the second temperature-sensitive device is a CTAT device configured to generate the second voltage which is complementary to the absolute temperature (CTAT).

4. The integrated circuit of claim 1, wherein a number of FETs in the first group is smaller than a number of FETs in the second group.

5. The integrated circuit of claim 1, wherein gate terminals of the FETs in the first group are connected together as a stacked gate of the first stacked gate device, wherein gate terminals of the FETs in the second group are connected together as a stacked gate of the second stacked gate device, wherein the stacked gate of the first stacked gate device and the stacked gate of the second stacked gate device are connected to the first terminal of the first stacked gate device.

6. The integrated circuit of claim 1, wherein channels of the FETs in the third group are serially connected between a first terminal of the third stacked gate device and a second terminal of the third stacked gate device, the integrated circuit further comprising:

a current source connected to the first terminal of the third stacked gate device, wherein the second terminal of the third stacked gate device is connected to the first terminal of the second stacked gate device.

7. The integrated circuit of claim 6, wherein gate terminals of the FETs in the third group are connected together as a stacked gate of the third stacked gate device, wherein the stacked gate of the third stacked gate device is connected to the first terminal of the third stacked gate device.

8. The integrated circuit of claim 1, wherein the second temperature-sensitive device includes a plurality of stacked gate devices connected in parallel, and wherein the third stacked gate device is one of the stacked gate devices connected in parallel.

9. The integrated circuit of claim 8, wherein each of the stacked gate devices connected in parallel is a stacked gate device formed with a group of FETs stacked together.

10. The integrated circuit of claim 9, further comprising:

a current source; and wherein each of the stacked gate devices connected in parallel has a first terminal thereof connected to the current source, has a second terminal thereof connected to the first terminal of the second stacked gate device, and has channels of all FETs therein serially connected between the first terminal thereof and the second terminal thereof.

11. An integrated circuit comprising:

a first temperature-sensitive device configured to generate a first voltage which monotonically increases with an absolute temperature, wherein the first temperature-sensitive device has a first stacked gate device formed with a first group of field-effect transistors (FETs) stacked together and a second stacked gate device formed with a second group of FETs stacked together;

a second temperature-sensitive device configured to generate a second voltage which monotonically decreases with the absolute temperature, wherein the second temperature-sensitive device has a third stacked gate device formed with a third group of FETs stacked together; and an output terminal configured to generate a reference voltage which is based on the first voltage from the first temperature-sensitive device and the second voltage from the second temperature-sensitive device;

a first current source and a second current source; and a current path selector configured to connect the first current source to the first temperature-sensitive device and connect the second current source to the second temperature-sensitive device during a first time period and configured to connect the first current source to the second temperature-sensitive device and connect the second current source to the first temperature-sensitive device during a second time period.

12. The integrated circuit of claim 11, wherein the first temperature-sensitive device is a PTAT device configured to generate the first voltage which is proportional to the absolute temperature (PTAT).

13. The integrated circuit of claim 11, wherein the second temperature-sensitive device is a CTAT device configured to generate the second voltage which is complementary to the absolute temperature (CTAT).

14. The integrated circuit of claim 11, wherein a number of FETs in the first group is smaller than a number of FETs in the second group.

15. The integrated circuit of claim 11, wherein each FET has a channel thereof between a source terminal thereof and a drain terminal thereof, wherein channels of the FETs in the first group are serially connected between a first terminal of the first stacked gate device and a second terminal of the first stacked gate device, wherein channels of the FETs in the second group are serially connected between a first terminal of the second stacked gate device and a second terminal of the second stacked gate device, and wherein the second terminal of the first stacked gate device is connected to the first terminal of the second stacked gate device.

16. An integrated circuit comprising:

a first current source and a second current source;

a current path selector having a first input connected to the first current source and having a second input connected to the second current source, wherein the current path selector also has a first output and a second output, wherein the current path selector is configured to connect the first input to the first output and connect the second input to the second output during a first time period and configured to connect the first input to the second output and connect the second input to the first output during a second time period;

a first temperature-sensitive device having a first stacked gate device and a second stacked gate device, wherein the first stacked gate device has a first terminal thereof connected to the first output of the current path selector and has a stacked gate thereof connected to the first output of the current path selector, and wherein the second stacked gate device has a first terminal thereof connected to a second terminal of the first stacked gate device and has a stacked gate thereof connected to the first terminal of the first stacked gate device;

a second temperature-sensitive device having a third stacked gate device, wherein the third stacked gate device has a first terminal thereof connected to the second output of the current path selector, has a stacked gate thereof connected to the second output of the current path selector, and has a second terminal thereof connected to the first terminal of the second stacked gate device; and wherein each of the first stacked gate device, the second stacked gate device, and the third stacked gate device is a stacked gate device formed with a group of FETs stacked together.

17. The integrated circuit of claim 16, wherein channels of all FETs in the group of FETs are serially connected together, and wherein gate terminals of all FETs in the group of FETs are connected together as a stacked gate.

18. The integrated circuit of claim 16, wherein the second temperature-sensitive device includes a plurality of stacked gate devices connected in parallel, and wherein the third stacked gate device is one of the stacked gate devices connected in parallel.

19. The integrated circuit of claim 18, wherein each of the stacked gate devices connected in parallel is a stacked gate device formed with a group of FETs stacked together.

20. The integrated circuit of claim 18, wherein each of the stacked gate devices connected in parallel has a first terminal thereof connected to the second output of the current path selector, has a second terminal thereof connected to the first terminal of the second stacked gate device, and has channels of all FETs therein serially connected between the first terminal thereof and the second terminal thereof.

* * * * *